United States Patent Office 2,762,185
Patented Sept. 11, 1956

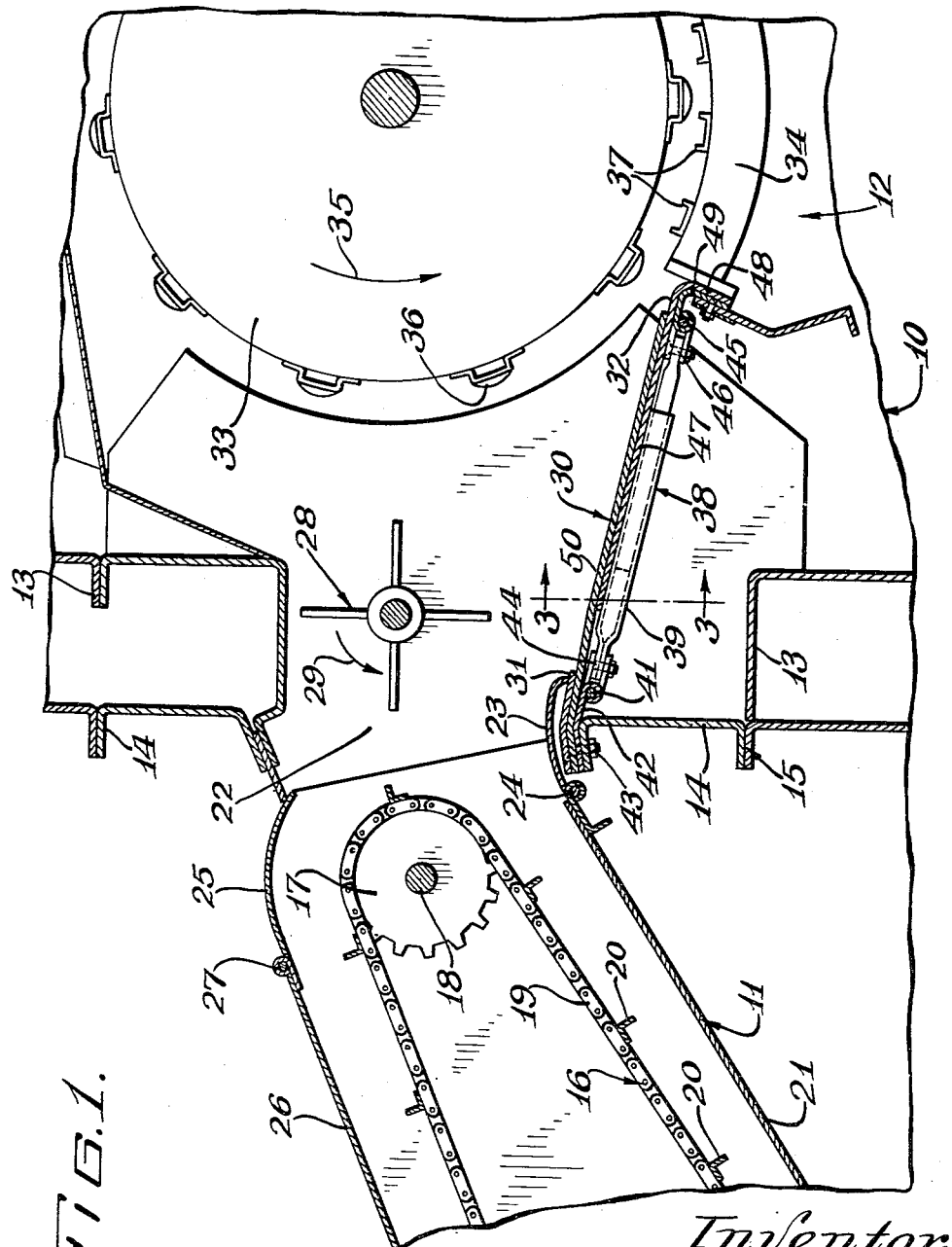

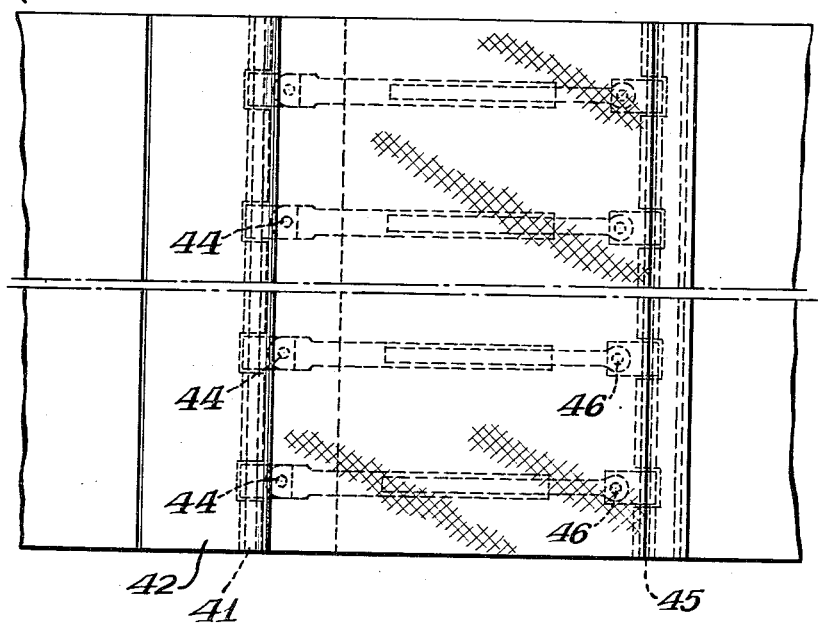
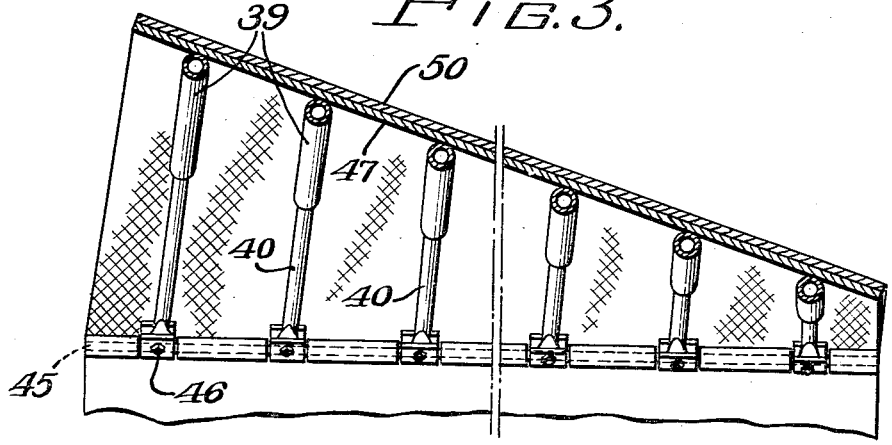

2,762,185

FLEXIBLE CONTINUOUS FLOOR BETWEEN HARVESTER AND THRESHER ON HILLSIDE COMBINES

Charles M. Hyman, Davenport, Iowa, and Albert L. De Porter, Moline, Ill., assignors to International Harvester Company, a corporation of New Jersey Application December 15, 1953, Serial No. 398,362

3 Claims. (Cl. 56—209)

This invention relates to a new and improved flexible continuous floor between harvester and thresher on hillside combines.

In the operation of combines the machine is adapted to be moved through a field of growing grain whereupon the grain is cut by a harvesting portion of the machine and thence delivered to a threshing portion of the machine. Efficient threshing depends to a considerable extent upon obtaining a uniform depth of material to be threshed throughout the full width of the thresher and the grain separating mechanism. Obviously then a regular combine is most effective on level terrain. In order that combines may be usable over hilly fields, the harvesting portions have been designed to permit relative movement with respect to the threshing and separating portions of the combines. Thus when a combine is operating on a hillside the threshing mechanism is maintained horizontally level while the harvesting portion is tilted to a position parallel with the side of the hill. The use of machines which employ these relatively rotating parts occasion many problems heretofore non-existent in the combine art.

It is, therefore, a principal object of this invention to provide a floor which will remain continuous and be sufficiently flexible to assume the necessary shape occasioned by the relative angular positioning between a harvester portion and a thresher portion of a combine.

An important object of this invention is the provision of means for a flexible continuous floor positioned between members having relative rotation therebetween.

Another important object of this invention is to supply a series of telescoping supporting members beneath a flexible floor whereby the flexible floor is rigidly supported despite the necessity of having various conformations of the floor.

A still further important object of this invention is to provide a plurality of spaced apart telescoping members each having their one end hinged for universal movement with respect to one portion of a device and each member having its other end hinged for universal movement about another portion of a device wherein the portions are permitted relative angular movement with respect to each other.

Another and still further important object of this invention is the provision of a flexible floor for carrying material between members having relative angular movement and the floor consisting of a plurality of spaced apart telescoping supports having overlapped flexible sheets of fabric.

Another important object of this invention is to equip a flexible floor adapted to conform to any shape necessary for joining members having relative angular movement with a general incline from the delivery portion of the floor to the discharge portion of the floor.

Other and further important objects and advantages of this invention will become apparent from the disclosures in the following specification and accompanying drawings.

In the drawings:

Figure 1 is a fragmentary view of a longitudinal section taken through a combine and including the flexible floor of this invention located between the harvester portion and thresher portion of the combine;

Figure 2 shows generally a top plan view of the flexible floor of this invention; and Figure 3 is a sectional view taken on the line 3—3 of Figure 1.

As shown in the drawings the reference numeral 10 indicates generally a combine consisting of a harvester portion 11 and a threshing portion 12. More particularly the combine 10 is of the type usable in hilly country wherein the thresher portion 12 thereof may be maintained horizontally level while the harvesting portion 11 may be tilted or angularly adjusted so that the crop cutting or pickup portion thereof may be parallel with the ground. Let us assume, for example, that the thresher and separator portion 12 is maintained on a horizontal level in order that we obtain the greatest efficiency in the threshing of grain that is passed therethrough. It should be understood that means for maintaining this horizontal level is necessary. This usually takes the form of linkage means between the thresher part and the ground wheel supports. However, in the present instance this adjustment forms no part of this invention and the linkage mechanism has not been shown. We will assume then that the frame structure 13 defining a circular opening at the forward end of the thresher portion 12 will remain stationary whereas the frame structure 14, which is circular in shape and constitutes the rearward end of the harvesting portion 11, is rotatable. The circular frame structure 14 is adapted to be rotated within the circular opening 13 within the thresher part 12. This circular joint or turntable is designated generally as 15.

The harvesting portion 11 of the combine 10 is adapted by means not shown for picking up grain to be threshed and thereupon elevating it upwardly and rearwardly by means of a conveyor 16 to a position centrally of the rearward circular frame structure 14. The conveyor 16 consists of carrying sprockets 17 mounted on a shaft 18 journally supported in the harvesting portion 11, an endless chain 19 and cross slats 20. Generally the conveyor 16 is known as an undershot type of conveyor wherein cross slats 20 are adapted to feed material up the inclined floor 21 of the feeder portion of the harvester 11. The central portion of the circular frame structure 14 defines an opening 22 between the harvester portion and the thresher portion of the combine. Inasmuch as the harvesting portion must be capable of vertical adjustment for varying the height of cut or grain pickup, the attachment thereof to the turntable frame 14 is such that the lower and upper housing portions are hinged in such a manner to permit this vertical adjustment. As shown in Figure 1, the rearmost portion of the floor 21, designated by the numeral 23, is hinged at 24 to permit vertical swinging movement of the harvester about the hinge 24 as a transverse axis. Similarly an extension 25 of the top wall 26 of the harvester feeder housing is hinged as at 27 to permit extension 25 to be raised or lowered at the location of the discharge end of the conveyor 16 dependent upon the angular relationship of the harvesting portion 11 with respect to the hinged member 23. Although the harvesting portion 11 has been shown to have relative vertical movement with respect to the circular frame 14 of the turntable joint 15, it should be understood that for all other purposes the frame structure 14 forms a part of the harvesting portion 11. Thus when the harvester portion 11 is desired to be tilted for lateral adjustment to lie parallel with hilly ground it is accomplished through rotation of the turntable 15.

As stated above it is the primary object of this invention to provide continuous floor means between the harvester and thresher portions of a combine which have relative angular movement therebetween. Movement of grain or other material to be threshed is assisted in the space 22 by a rotating beater member 28 moving in the direction of the arrow 29, thus causing the material as it is discharged from the undershot feeder conveyor 16 to be moved rearwardly along the floor designated generally by the numeral 30. This floor 30 is inclined from a high portion at its forward end 31 adjacent the harvester to a relatively lower portion 32 adjacent the rear or thresher portion of the combine. Threshing is accomplished by the cooperation of a threshing cylinder 33 with a concave 34. The cylinder 33 rotates in the direction of the arrow 35 and by means of rub-bars 36 thereon cooperating with cross bars 37 on the concave 34 grain is threshed.

It is thus apparent that the floor 30 performs the important function of delivering and guiding grain from the harvester to the thresher portion of a combine. If the floor 30 were to be discontinuous in any respect, a portion of the harvested grain would be lost. Yet, in order to compensate for the relative angular movement between the harvester and thresher portions, it would seem like an insurmountable job to obtain a continuous floor which would be flexible enough to assume any shape required and yet sufficiently rigid to carry any load that might be passed thereover.

The floor 30 is supported by a plurality of laterally spaced apart longitudinally extending telescoped members 38. Each of these telescoped members consist of tubular socket members 39 and rod members 40 which are adapted to telescope within the sockets 39. As shown in Figures 1 and 2, the tubular socket members have their upper ends adjacent the harvester portion hinged on a transverse pin 41. The pin 41 extends entirely across the opening defined by the transition space 22 between the harvester and the thresher. The other part of this transverse hinge is designated as 42 and is bolted at 43 to the circular frame 14. In addition to the hinging about the pin 41 which thus permits the tubular sockets 39 to have vertical swinging movement, the tubular sockets 39 are each individually hinged about vertically disposed pins 44 whereby the tubular sockets may be arcuately swung laterally. Thus the combined hinges 41 and 44 of the sockets 39 constitute a universal hinging of these members with respect to the harvesting portion 11 of the combine 10. Similarly the rod members 40 are hinged about the transversely disposed pin 45 and also about vertically disposed pins 46 in the same manner as the sockets are hinged about the rod 41 and the pins 44. Thus the rod members 40 have universal swinging movement with respect to the thresher portion 12 of this combine. These laterally spaced apart longitudinally extending telescoped members 38 constitute a primary portion of the support means between the harvester and thresher. No matter what angular relationship the harvester assumes with respect to the thresher the multiple universally hinged telescoping members 38 will be able to conform to the desired position by greater or lesser telescoping of the individual members and by reason of the infinite latitude in positions made possible by the universal hinge attachments.

Although we have shown that the transition space 22 between the harvester and thresher is equipped with rigid supports, the telescoping members alone are not sufficient to provide a floor for the grain that is passed thereover. The floor thus additionally includes a first flexible fabric sheet 47 which is fastened at 48 by means of bolts or the like to the thresher portion 12 along with the hinge portion 49 extending rearwardly from the transverse pin 45. The flexible sheet 47 thus extends forwardly over the telescoping members 38 and is continuous across the full space 22. A second flexible fabric sheet 50 is fastened by means of bolts 43 to the harvester portion 11 and along with the hinge portion 42 of the tubular sockets 39. The flexible fabric sheet 50 thus extends downwardly from the upper forward portion to the lower rearward portion with substantial overlap of the flexible fabric sheet 47. It will thus be seen that relative movement of the harvester and thresher portions is possible and at the same time the floor 30 therebetween is continuous and uninterrupted although assuming a variety of unusual shapes to conform to the different angular positions of the two portions. As explained, the telescoping members 38 perform the rigid support for the floor, and the overlapping flexible sheets 50 and 47 contribute the continuous surface in such a manner that although these flexible sheets are overlapped to a greater or lesser degree during the different angular positions of the harvester and thresher portions, they are nevertheless always overlapped and with the top sheet 50 inclined downwardly and rearwardly at least slightly so that the material moving thereover will not be apt to gain entrance to a position between the overlapped sheets.

We are aware that numerous details of construction may be varied throughout a wide range without departing from the principles disclosed herein and we, therefore, do not propose limiting the patent granted hereon otherwise than as necessitated by the appended claims.

What is claimed is:

1. A supporting structure, said supporting structure having two members movable rotatably with respect to each other, a flexible continuous floor disposed between said two members having relative rotation comprising a plurality of spaced apart tubular sockets hingedly mounted on one of said two members, a plurality of spaced apart rods hingedly mounted on the other of said two members, each of said rods telescoping one of said tubular sockets, a first flexible fabric sheet fixed to one of said members and positioned over said telescoped sockets and rods, and a second sheet of flexible fabric fixed to the other of said members and adapted to overlie the telescoped sockets and rods, and said first and second fabric sheets having substantial overlap whereby when the members are rotated relative to one another the flexible floor therebetween conforms to any necessary shape by the sockets and rods telescoping a greater or lesser amount and the overlying fabric sheets overlapping at any angle or to any degree.

2. A device as set forth in claim 1 in which the floor generally slopes downwardly from one member to the other member and the top overlapping fabric sheet is higher at its fixed end than its discharge end.

3. A device as set forth in claim 1 in which the hinges of the sockets and the rods are universal hinges permitting the sockets and rods to assume any angular position.

References Cited in the file of this patent

UNITED STATES PATENTS

| | | |
|---|---|---|
| 570,405 | Jerguson et al. | Oct. 27, 1896 |
| 1,972,407 | Morse | Sept. 4, 1934 |
| 2,159,663 | Lindgren | May 23, 1939 |
| 2,654,207 | Long | Oct. 6, 1953 |